Patented Mar. 24, 1953

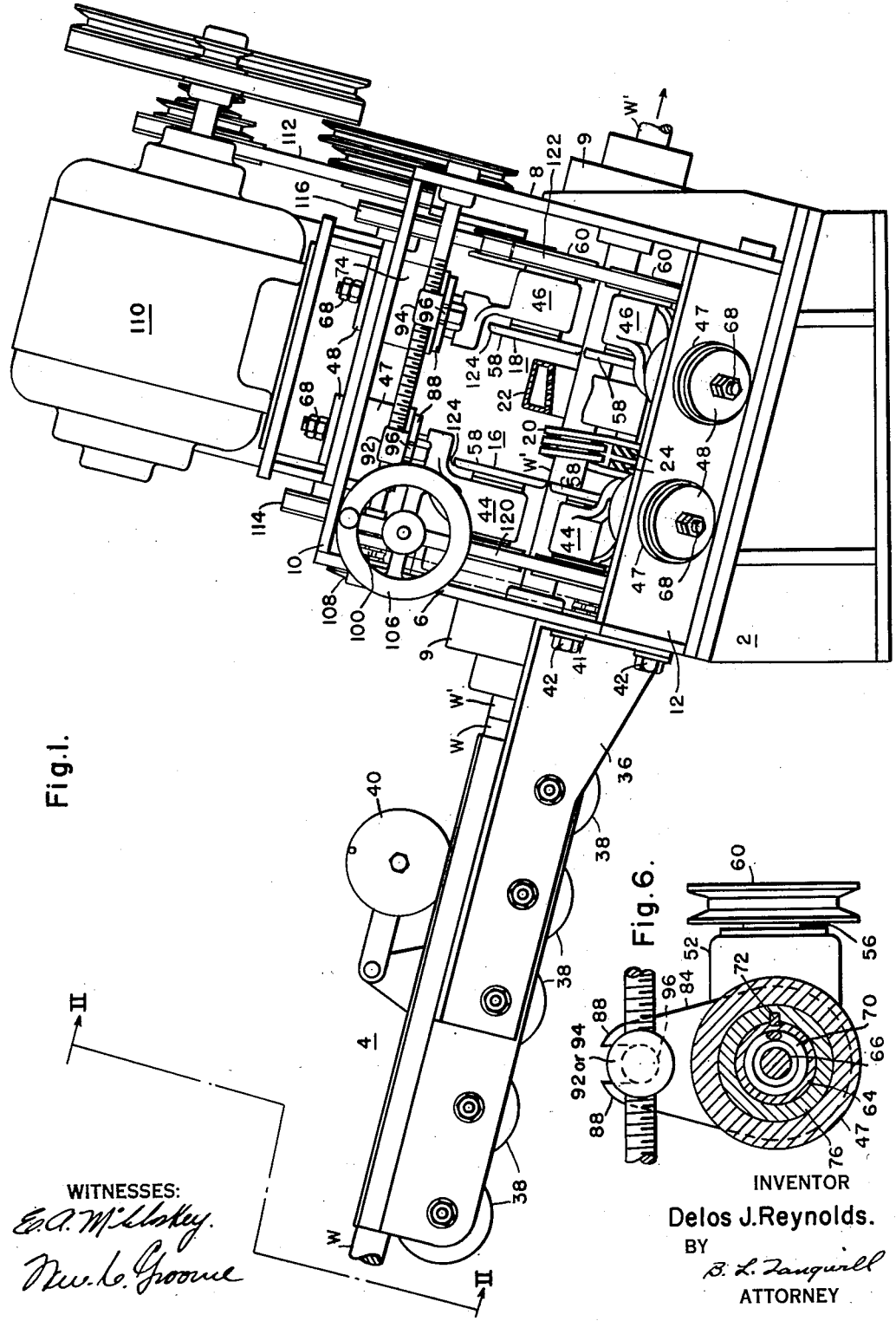

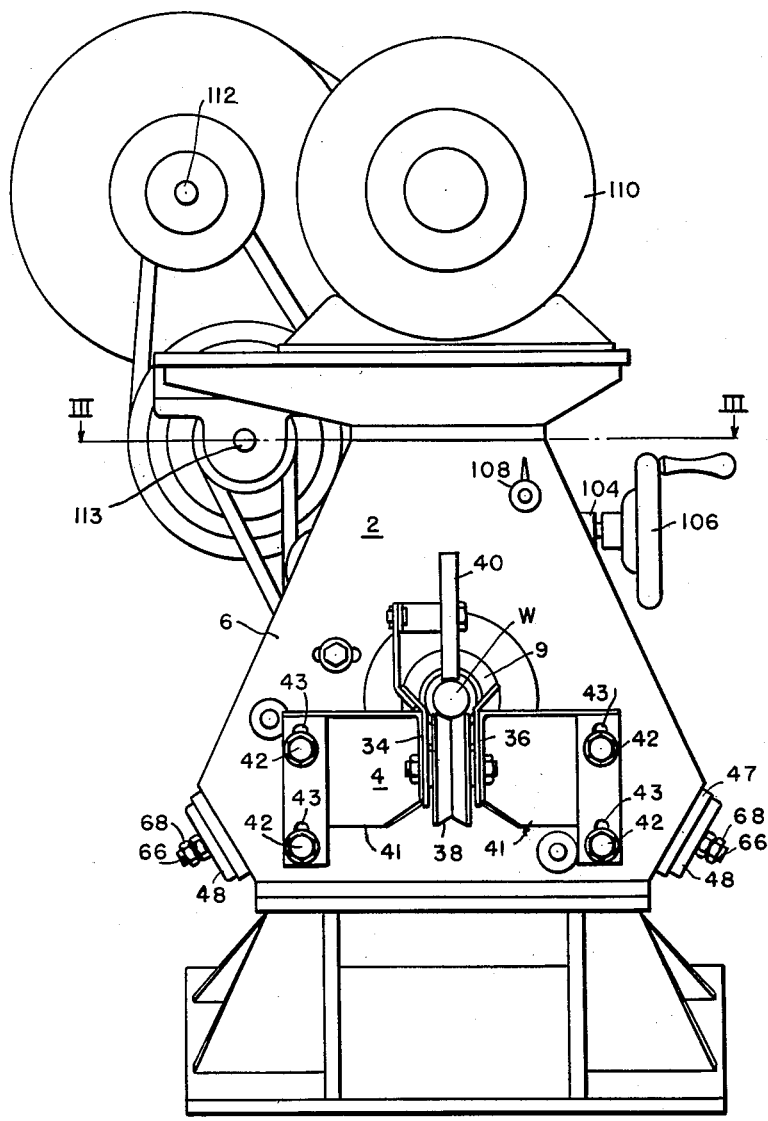

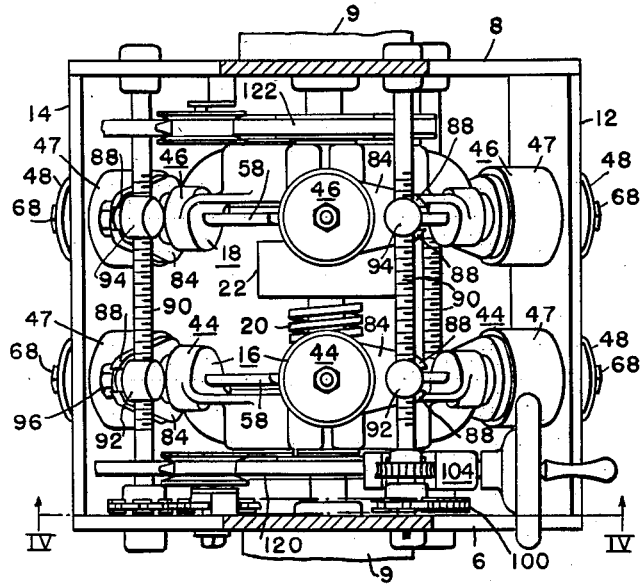
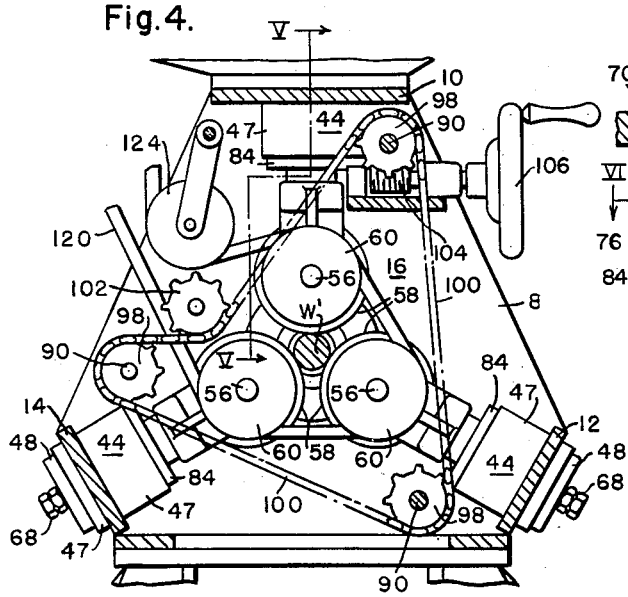
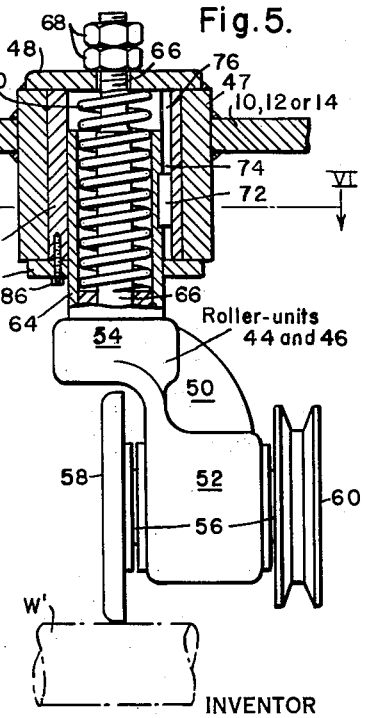

2,632,839

UNITED STATES PATENT OFFICE 2,632,839

APPARATUS FOR THE CONTINUOUS INDUCTION HEATING OF ROUND RODS AND THE LIKE

Delos J. Reynolds, Chicago, Ill., assignor to Westinghouse Electric Corporation, East Pittsburgh, Pa., a corporation of Pennsylvania Application October 28, 1948, Serial No. 57,038

11 Claims. (Cl. 219—47)

Broadly, this invention is directed to improved apparatus for inductively heating a single elongated work-piece or for inductively heating a plurality of work-pieces, as they move, one after another, through the apparatus. More specifically, this invention is directed to the induction heat-treatment of the round bars, rods and similar work-pieces which are arranged end to end and passed through an induction heating coil at a predetermined rate, and then passed, if desired, through a quenching means.

A broad object of my invention is to provide a machine in which rods can be inductively heat-treated on a mass production basis.

An object of the invention is to provide an induction heating apparatus having an induction heating coil arranged therein and a positive drive for simultaneously rotating and linearly moving a piece of work through the induction heating coil. Preferably the apparatus operates continuously with one work-piece following another through the apparatus. Preferably, but not necessarily, each work-piece rotates in a direction opposite to the angular direction in which the turns of the induction heating coil twist so that a much more uniform heat treatment results than would be the case if the work-piece rotated in the same direction as the twist of the turns of the induction heating coil.

An overall purpose of the invention is to provide an induction heat-treating machine of a type described, which is inexpensive in cost, economical to operate, substantially fool-proof in operation, and sufficiently flexible to heat treat rods of different sizes and materials, and at adjustable rates of travel through the machine.

A novel feature of my invention is to control the progression of a metal rod through an induction heating machine of a type described by a simple adjustable means that can be readily manually controlled for increasing or decreasing the speed with which the rod progresses through the machine for heat-treatment.

A further feature of my invention resides in a novel roller means for rotatably supporting the work-piece and moving it through the machine.

Objects, features, combinations and innovations of my invention, in addition to the foregoing, will be discernible from the following description of a preferred embodiment thereof. This description is to be taken in conjunction with the accompanying drawings consisting of the following views in some of which minor parts have been omitted for the sake of clarity:

Figure 1 is a side view of a machine embodying my invention,

Fig. 2 is an end view of a machine looking in the general direction indicated by the lines II—II of Fig. 1, that is, looking from the forward or work-feeding end toward the rear or work-exit end, Fig. 3 is a sectional view taken substantially along the lines III—III of Fig. 2 but with some driving and other parts omitted, Fig. 4 is a sectional view substantially on the lines IV—IV of Fig. 3, Fig. 5 is an enlarged view, substantially on the line V—V of Fig. 4, of a roller unit of which a plurality are used in the preferred form of my apparatus for rotating and for translating a work-piece, and Fig. 6 is an enlarged sectional view taken substantially on the lines VI—VI of Fig. 5.

The preferred form of my invention, as more particularly shown in Figs. 1, 2 and 4, comprises a frame 2 that carries a loading table 4. The frame 2 has a pair of end members or plates 6 and 8, the former facing the loading table and the latter being at the work-discharge end of the apparatus. The end members 6 and 8 are hexagonal with top and bottom sides generally horizontal. As is apparent from Fig. 4, the top edge of an end member is shorter than its bottom edge. The two edges which extend upwardly and outwardly from the bottom edge are shorter than the top edge. The end members 6 and 8 removably carry anti-friction guide bearings 9 through which work-pieces pass. The holes in the end members 6 and 8, which are aligned with the bearings, are oversize so that any one set of bearings can be replaced by a set of bearings of different size for accommodating rods of different diameters. However, the bearings themselves are preferably oversize so that a work-piece can pass freely therethrough, while resting on the bottoms of the bearings.

The frame 2 further comprises a top-bar 10 and lateral side bars 12 and 14 extending between the end members 6 and 8. The bar 10 is along the top edges of the end members; and the bars 12 and 14 are along the aforesaid short upwardly extending edges thereof.

A pair of spaced motion-imparting mechanisms 16 and 18 are carried inside the frame, the former being nearer to the end member 6 and the latter being nearer to the end member 8. A helical induction heating coil 20 and a quench ring 22 are supported by the frame in any suitable manner between the motion-imparting mechanisms 16 and 18. As shown in Fig. 1 the ends of the induction heating coil 20 are secured to insulators 24 that are carried by the frame.

The loading table 4 comprises a pair of spaced vertical side plates 34 and 36 which rotatably support a plurality of V-shaped rollers 38 between them. The table rollers 38 are arranged successively along the travel-path for work-pieces to be fed to the heat-treating means comprising the heating coil 20 and the quench ring 22. The V-grooves in the rollers 38 support a work-piece loosely therein so that the work-piece can rotate about its own axis as it linearly, or axially, moves along. A marked idler roller 40, bearing lightly on the top of a work-piece, is for the purpose of timing the rate of movement of the work through the machine. The loading table has end plates 41 which abut the end member 6 of the frame 2, and are secured thereto by a plurality of adjustable fastening means in the form of bolts 42 which pass through elongated slots 43 in the plates 41. The elongated slots permit the loading table to be adjusted along the end member 6 for alignment and for accommodating rods of different diameters.

The bearings 9, the motion-imparting mechanisms 16 and 18, the induction heating coil 20 and the quench ring 22 are arranged in the frame 2 so that a work-piece leaving the loading table 4 can travel in a straight line through them. This means that the openings in the aforesaid parts should be substantially coaxial, adapted smoothly to receive work-pieces leaving the loading table. Fig. 1 shows a pair of elongated work-pieces W and W' in proper arrangement in the apparatus. These work-pieces are adapted to move through the machine in the direction of the arrow shown at the right of Fig. 1. The work-piece W' is shown in the process of being heat-treated, with the work-piece W following along for heat-treatment. In the preferred embodiment, the force of gravity is utilized to move the work-pieces along the loading table. To this end the apparatus is so constructed that the rectilinear travel-path for the work-piece is at an angle to the horizontal, as much as 45° being recommended.

The motion-imparting mechanisms 16 and 18 are primarily for supporting and controllably rotating a work-piece as it passes through the induction heating coil 20 and quench ring 22; but they also progress or control the progression of the work-piece through these heat-treatment parts. To this end each mechanism comprises a means for rotating the work-piece, and in the preferred form of my invention, this same means also affects the progression of the work-piece.

In the preferred form of my invention, to which I am not limited, each motion-imparting mechanism comprises a turnable means for rotating the work-piece, the turnable means of a mechanism being arranged circumferentially around the path of travel for the work-piece. The turnable means of the mechanism 16 comprises a plurality of roller units 44, a sufficient number being provided to provide a support for the work-piece. In the preferred embodiment, the mechanism 16 comprises three triangularly-arranged roller units 44, each of which is secured respectively to one of the bars 10, 12 and 14; and the turnable means of the mechanism 18 comprises three triangularly-arranged roller units 46, each of which is also respectively carried by one of the bars 10, 12 and 14. In order to support the roller units, each bar is provided, as shown in Figs. 3 and 5, with a pair of spaced cylinder members 47 each of which is closed at one end by a centrally apertured disc 48.

The roller units 44 and 46 are alike and each is constructed as shown more particularly in Figs. 5 and 6. Each comprises a reinforced angular member 50 having a leg 52 and a second leg 54. The leg 52 comprises a journal for a shaft 56. A turnable member in the form of a disc roller 58 is secured to one end of the shaft 56, under the leg 54; and a driving means in the form of a sheave 60 is secured to the other end of the shaft. The sheave 60 has a smaller diameter than the disc roller 58. The other leg 54 of the angular member 50 projects over the disc roller 58 and is provided with a boss-like portion to which is fixed an outwardly-extending tubular sleeve 64 and a central rod 66. The sleeve 64 and rod 66 are coaxial but the latter is longer than the sleeve. Their common axis is perpendicular to and intersects the axis of the shaft 56. Preferably the common axis lies in a plane that includes the disc roller 58. The rod 66 has a threaded end that passes through the central hole in the stationary disc 48 of a bar 10, 12 or 14, as the case may be. This central hole is oversize with respect to the threaded rod-end so that the rod-end passes freely therethrough. Holding and adjusting nuts 68 are threaded on the outer protruding portion of the threaded rod-end. A compression spring 70 is provided that is lengthwise between the sleeve 64 and the rod 66, being compressed between the disc 48 and the leg 54 of the angular member 50. It is to be noted that the free end of the sleeve 64 is spaced from the stationary disc 48. Consequently, the angular member 50 and the parts carried thereby, including the disc roller 58, have a limited resilient movement linearly in a direction parallel to the common axis of the rod 66 and sleeve 64 to take care of any small non-uniformity or unevenness in the diameter of a rod or of different rods.

The roller unit is supported so that it can be rotatorily or angularly adjusted about the aforesaid common axis. To this end the sleeve 64 is slidably keyed, through a key 72 and a keyway 74, to a second sleeve 76 so that the two sleeves are relatively axially movable, but must turn together. The sleeve 76 is rotatably nested in the stationary cylinder member 47 on a bar 10, 12 or 14, as the case may be, and can be swiveled by a swivel arm 84 that is fixed to the bottom of the second sleeve 76 by any suitable fastening means such as a plurality of bolts 86. This swivel arm extends outwardly radially beyond the cylinder member 47, as shown in Fig. 6, and terminates in a fork-like portion provided with spaced fingers 88. By moving a member between the fingers 88, the roller unit can be twisted to any desired angle around the axis of the sleeves 64 and 76 of Fig. 5. By this means the speed of the progression of the work-piece can be controlled as will later be described.

The roller units of the motion-imparting mechanisms 16 and 18 are so carried by the bars 10, 12 and 14 that a disc roller of one mechanism faces that of the other mechanism. The disc rollers of each mechanism are disposed circumferentially about the path of travel for a work-piece and so constitute a support for it. The supporting group of disc rollers have points circumferentially about the travel-path which simultaneously contact a work-piece as it passes through the machine. This is indicated more clearly in Figs. 1, 4 and 5. The disc rollers 58 of the roller units 44 of the mechanism 16 lie generally in the plane when they are adjusted so as to be perpendicular to the line of travel of the work-piece through the machine. The same is true for the disc rollers 58 of the roller units 46 of the mechanism 18 at the other side of the machine. However, for controllably progressing the work-piece through the machine, the roller units can be turned by their swivel arms 84 about their respective axes. The lines about which the disc rollers can be turned are extensions of the axes of the associated rods 66 and sleeves 64 and 76, and they lie in a single plane. The angle through which each roller unit is turned or twisted may be very small, as little as 1° or less and rarely more than 4° or so, but can be greater, depending on how fast a work-piece is to be moved through the machine.

It is desirable to adjust the aforesaid twist of all of the disc rollers at the same time and to the same extent. To this end, the machine is provided with a swivelling means for simultaneously turning the swivel arms 84 of the roller units 44 and 46. Such means comprises a plurality of lead screws 90 which parallel the side frame-bars 10, 12 and 14, respectively, and are rotatably journaled in suitable bearings in the end members 6 and 8. In the embodiment shown there are three such lead screws, each of which operates one roller unit 44 of the motion-imparting mechanism 16, and one roller unit 46 of the motion-imparting mechanism 18. The two roller units operated by a common lead screw are those secured to the same frame-bar 10, 12 or 14.

Each lead screw 90 has a pair of nut members 92 and 94 threaded thereon. Each nut member 92 of each lead screw is associated with one roller unit 44 of the mechanism 16, and the nut member 94 on the same lead screw is associated with one roller unit 46 of the mechanism 18. Each of the nut members 92 and 94 has a stub-shaft 96 which fits between the fingers 88 of the associated swivel arm 84. Any suitable means is provided for causing the nut members 92 and 94 to move rectilinearly along the lead screws when the lead screws are rotated. A sprocket arrangement is provided to rotate the lead screws in unison.

As shown more particularly in Figs. 3 and 4, this screw-rotating means comprises a sprocket wheel 98 at corresponding ends of each lead screw 90. The sprocket wheels are coplanar and an endless sprocket chain 100 meshes with all of them. An idler sprocket 102 keeps the chain taut. A worm arrangement 104 meshes with one of the lead screws and can be turned by a wheel 106 which is at an accessible place on the outside of a machine. An indicating pointer 108, geared to a lead screw, indicates the skew of the disc rollers 58 of the roller units 44 and 46 with respect to a position perpendicular to the work-piece W'. The wheel 106 can be used manually to adjust the skew-angle of the disc rollers 58 either while they are being continuously rotated by their shafts 56 or while stationary.

The shafts 56, to which the disc rollers are secured, are driven from a common power source indicated as an electric motor 110, a belt drive speed-reducer 112, and a power distributing shaft 113 having drive pulleys 114 and 116 at their opposite ends thereof. The pulley 114 drives an endless belt 120 for the sheaves 60 of the roller units 44 of the motion-imparting mechanism 16; and the pulley 116 drives an endless belt 122 for the sheaves 60 of the roller units 46 of the motion-imparting mechanism 18.

In operation of the apparatus, a work-piece can be moved down the loading table 4 and through the bearing 9 in the end member 6 until it reaches the disc rollers 58 of the motion-imparting mechanism 16. All of the disc rollers have rounded edges 124 on the side toward the entering work to make it easy for the work-piece to enter and be gripped by the disc rollers. The rotating disc rollers 58 of the mechanism 16 cause the work-piece to rotate, and the angle which the plane of the disc rollers make with the axis of the work-piece, that is with the line of travel of the work-piece, will determine how fast the work-piece will axially move in the direction of the arrow of Fig. 1. If the planes of the disc rollers are perpendicular to the axis of the work-piece, the disc rollers will cause the work-piece to rotate. If the planes are displaced from such perpendicular position, the disc rollers will not only rotate the work-piece but also move it in the direction of its axis, the speed of such progression depending upon the angle of twist, or skew, from such perpendicular plane, other things being equal. The hand wheel 106 can be turned to adjust the plane of the disc rollers to the proper angle for the desired speed of travel of the work-piece. Accordingly, the work-piece will move through the induction heating coil 20 at an adjusted speed, and at the same time it will rotate about its axis at an angular speed determined by the speed of the motor 110 and speed-change ratio of the speed reducer 112. Assuming that the heating coil is properly energized with alternating current, the portion of the work-piece in the heating coil will be heated. The heated portion of the work-piece progresses through the quench ring 22 which is supplied with a quenching liquid that discharges onto the heated surface of the work-piece through holes in the inner face of the quench ring in a manner known in the art. The work-piece is then received by the disc rollers 58 of the motion-imparting mechanism 18 which helps to rotate the work-piece and progress it through the exit bearing 9 in the end member 8. It is desirable to provide two mechanisms, such as 16 and 18, so that the work-piece will be positively driven by one or the other, preferably at a constant speed, first as it approaches the heat-treating means, comprising the induction heat coil 20 and the quench ring 22, and then later as it leaves the heat-treating means.

The work-piece W' will be rotated by the roller units 44 and 46 in an angular direction which depends on the direction in which the disc rollers 58 thereof are rotating; it being understood that these disc rollers rotate in the same direction at the same time. However, I have found that work-pieces can be heated more rapidly and more uniformly if a work-piece, as it moves through the induction heating coil, is made to rotate in a direction which is opposite to that in which the conductor-turns of the heating coil twist. Stated differently, if one looks in the direction of travel of the work-piece, and the conductor-turns of the heating coil twist in a right-hand screw direction, the work-piece should be rotated to correspond to a left-hand screw.

The apparatus can be easily adjusted to heat-treat rods of different diameters. The nuts 68 of each of the roller units 44 and 46 can be adjusted against the pressing force of its spring 70 to lower or raise its associated disc roller 58. This will move the point-of-contact of the disc roller with the work-piece toward or away from the center point between the disc rollers of a motion-imparting mechanism 16 or 18, that is, toward or away from the travel-path for the work-piece. The compression springs 70 comprise a means that tends to press the work-contacting points on the surfaces of the disc rollers 58 firmly onto the work-piece for providing the necessary friction between the disc rollers and the work-piece. The bearings 9 can be oversize to take care of different sized rods, but can also be replaced. The loading table 4 can be raised or lowered for the different sized rods, through the adjusting expedient comprising bolts 42 and slots 43.

If the lengths of the work-pieces are greater than the spacing between the motion-imparting mechanisms 16 and 18, no intermediate supports for the work-pieces are necessary, and each work-piece has at least two supporting points provided by the mechanisms and the bearings 9 in the end members 6 and 8. For shorter work-pieces additional supports would be necessary.

With the loading table 4 arranged to feed the work-pieces to the motion-imparting mechanism 16 at a 45° angle, the second motion-imparting mechanism 18 controls the movement of the work-piece after the work-piece leaves the mechanism 16.

Numerous changes may be made in the above-described construction, and different embodiments of the invention can be made without departing from the spirit and scope thereof. Accordingly, it is intended that all matter contained in the foregoing description or shown in the accompanying drawings be interpreted as illustrative and not in a limiting sense, unless otherwise required by the prior art.

I claim as my invention:

1. In apparatus of a type described for progressively inductively heating an elongated work-piece, in combination, a frame providing a linear path of travel for an elongated work-piece, an induction heating coil-means having one or more current-carrying conductor-turns about said travel-path, a plurality of roller units, supporting means carried by said frame and supporting said roller units about said travel-path linearly spaced from said conductor-turns, each of said roller units comprising a disc-type roller with a circumferential surface having a work-contacting point at said travel-path and comprising a pressure means tending to force the associated disc-type roller toward said travel-path, whereby to press the disc-type roller on a work-piece in said travel-path, said supporting means supporting the last said disc-type rollers such that the latter rollers may be adjustably skewed with respect to the line of travel for the work-piece and in a direction opposite to that of said conductor-turn or -turns.

2. In apparatus of a type described, in combination, a support-means providing a linear path of travel for an elongated work-piece, a helix-like induction heating coil having spaced conductor-turns about said travel-path, said turns being twisted in a predetermined angular direction, means for rotating and progressing the work-piece along said travel-path and through said heating coil, the last said means comprising a rotatable member adapted to engage the work-piece and rotate and progress it in a helix-like path, one of said helices being right-hand and the other left-hand.

3. Apparatus of a type described adapted for the inductive heat-treatment of elongated work-pieces such as rods and the like, comprising in combination, a loading table having sloped work-supporting and guiding means for guiding a work-piece along a path of travel which is at an angle to the horizontal; a first motion-imparting mechanism along said sloped travel-path arranged to receive work leaving an end of said loading table; a second motion-imparting mechanism subsequently along said sloped travel-path and spaced from the first motion-imparting mechanism; each of said motion-imparting mechanisms having a plurality of disc rollers about said sloped travel-path adapted to contact a work-piece for causing it to rotate, driving means for said disc rollers, and common adjusting means connected to respectively said first motion-imparting mechanism and said second motion-imparting mechanism for simultaneously twisting the axes about which the disc rollers rotate.

4. Apparatus of a type described for the inductive heat-treatment of elongated work-pieces such as rods and the like, comprising in combination, a loading table having work-supporting and guiding means for guiding a work-piece along a path of travel; a heat-treating means comprising an induction heating coil along said travel-path; and a motion-imparting mechanism along said travel-path and between an end of said induction heating coil and the work-leaving end of said loading table, said motion-imparting mechanism having disc rollers with a plurality of points circumferentially about said travel-path adapted to contact a work-piece for causing it to rotate, driving means for rotating said disc rollers, and a swivelling device for twisting said disc rollers simultaneously through the same angle.

5. An invention including that of claim 4 but further characterized by said disc rollers having rounded edges on their sides toward the loading table.

6. In apparatus adapted for continuously progressively inductively heating an elongated work-piece, in combination, a supporting frame, a pair of spaced roller mechanisms, each of said roller mechanisms comprising a plurality of roller units carried by the frame, an induction heating coil in the space between said roller mechanisms, each of said roller units comprising a first leg having a drive shaft substantially parallel to the axis of said heating coil, a driving member and a work-moving roller on said shaft, a plurality of said work-moving rollers of each of said roller mechanisms being circumferentially spaced about the extended axis of said heating coil, each of said roller units comprising a second leg rotatably carried by said supporting frame on an axis substantially perpendicular to the axis of said heating coil, a swivel member for each roller unit engaging the second leg associated therewith for angularly adjusting it, and common operating means fastened to the swivel members on both of said roller mechanisms for simultaneously turning said swivel members.

7. In apparatus of a type described, in combination, a frame having opposite end members provided with aligned openings, said frame comprising a series of bars extending between said end members and disposed along different sides of the frame, a pair of spaced roller units carried by each bar, each roller unit having a supporting member secured to the associated bar, each roller unit comprising a first leg rotatable in its supporting member, a second leg at an angle to the first leg, a shaft carried by said second leg, means for rotating said shaft, and a disc roller on said shaft, a plurality of said disc rollers forming a group, a lead screw paralleling one of said bars, and gearing connecting said lead screw to said first legs to twist said pair of roller units simultaneously in the same angular direction.

8. In apparatus of a type described, in combination, a frame carrying a pair of spaced bearings, a group of roller units, supporting means supporting said group of roller units from said frame and between said bearings, said group of roller units comprising a plurality of disc rollers having diametric lines lying substantially in a common plane, and forming an opening between adjacent portions of their circumferences, the opening being in line with the openings in said bearings, each roller unit comprising resilient pressure means tending to force the associated disc roller toward a common line through said openings, and common driving means for rotating said disc rollers, said supporting means comprising a swivel joint for each of said roller units, and common operator means for swivelling said roller units simultaneously.

9. An invention including that of claim 8 but further characterized by said disc rollers having rounded edges.

10. Apparatus of a type described for an inductive heat-treatment of elongated work-pieces such as rods and the like, comprising, in combination, a frame having an end member having a work-receiving bearing providing a work-passage opening, a loading table having sloped work-guiding means and providing a sloped travel-path for a work-piece extending through said opening, an induction heating coil forming a first helix having an axis along a rectilinear extension of said travel-path, motion-imparting means for progressing the work-piece through said heating coil, said motion-imparting means having a plurality of rollers in front of said heating coil and in back of said heating coil, said rollers having a plurality of points about said travel path adapted to contact a work-piece therein for causing it to rotate, driving means for causing rotation of said rollers, whereby the path moved over by a point on the periphery of said work-piece is a second helix, one of said helices being a right-hand helix and the other said helix being a left-hand helix.

11. Apparatus of a type described for the inductive heat-treatment of elongated work-pieces such as rods and the like, comprising in combination, an inductive heating coil having its axis along a linear path of travel for a work-piece, motion-imparting means for progressing the work-piece through said heating coil, said motion-imparting means having a plurality of disc rollers in front of said heating coil and having a plurality of disc rollers in back of said heating coil, said disc rollers having a plurality of points about said travel path adapted to contact a work-piece therein for causing it to rotate, and driving means for causing rotation of said disc rollers, the axes of said disc rollers being substantially parallel to said travel path, separate swivel joint supports for said disc rollers, and common means fastened to the latter supports for simultaneously adjusting a plurality of said swivel joint supports in order to turn the disc rollers about axes substantially perpendicular to their own axes.

DELOS J. REYNOLDS.

REFERENCES CITED

The following references are of record in the file of this patent:

UNITED STATES PATENTS

| Number | Name | Date |
| --- | --- | --- |
| 505,221 | Harper | Sept. 19, 1893 |
| 1,406,047 | Mikshel | Feb. 7, 1922 |
| 1,513,113 | Jackson | Oct. 28, 1924 |
| 1,611,418 | Clipsham | Dec. 21, 1926 |
| 1,713,678 | Seibert | May 21, 1929 |
| 1,790,668 | Koon | Feb. 3, 1931 |
| 1,887,434 | Sammis | Nov. 8, 1934 |
| 2,040,767 | Dudley | May 12, 1936 |
| 2,063,800 | Fredrickson | Dec. 8, 1936 |
| 2,295,272 | Somes | Sept. 8, 1942 |
| 2,415,025 | Grell et al. | Jan. 28, 1947 |
| 2,417,678 | Cox | Mar. 18, 1947 |
| 2,461,283 | Jordan | Feb. 8, 1949 |